No. 680,029. Patented Aug. 6, 1901.
J. E. DUBRAY.
LUMBER COUPLING.
(Application filed Mar. 22, 1901.)

(No Model.)

Witnesses.
F. Monteverde.
G. M. Burt

Inventor.
J. E. Dubray
by Spear & Seely
Attorneys

UNITED STATES PATENT OFFICE.

JERRY E. DUBRAY, OF MADERA, CALIFORNIA.

LUMBER-COUPLING.

SPECIFICATION forming part of Letters Patent No. 680,029, dated August 6, 1901.

Application filed March 22, 1901. Serial No. 52,415. (No model.)

*To all whom it may concern:*

Be it known that I, JERRY E. DUBRAY, a citizen of the United States, residing at Madera, in the county of Madera and State of California, have invented certain new and useful Improvements in Lumber-Couplings, of which the following is a specification.

My invention relates to the transit of lumber in flumes, and more particularly to improvements in coupling together bundles of lumber in trains. In this method of shipment lumber cut and sawed in the mountains is conveyed to a shipping-point by flumes of water frequently over fifty miles in length. Such lumber is not floated loose because of liability to damage, but is clamped in substantially rectangular bundles composed of several boards. In order to keep these bundles in single file in the flume and prevent them from wedging and stopping by getting abreast of one another, short pieces of rope are doubled and twisted and are clamped between boards of adjacent bundles. These ropes are then tied or connected together by a third piece of rope, so that the bundles compose a train. These rope couplings are exposed, first, to the action of water; second, to the pulling strain between the bundles, and, third, to a torsional strain or twisting action caused by the bundles turning over and over in the flume. They are as a rule unfit for use after one trip, and their supply and renewal constitute a heavy item of expense in flume transportation.

The object of my invention is to furnish a cheap, simple, and permanent coupling which can be used for an indefinite length of time.

Figure 1:
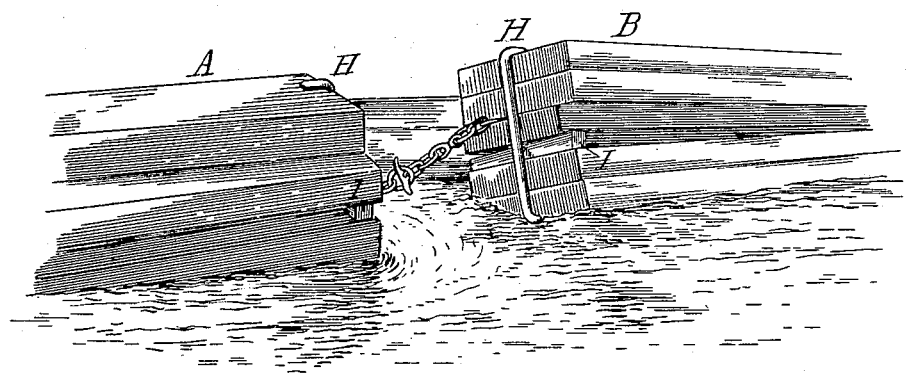
Figure 2:
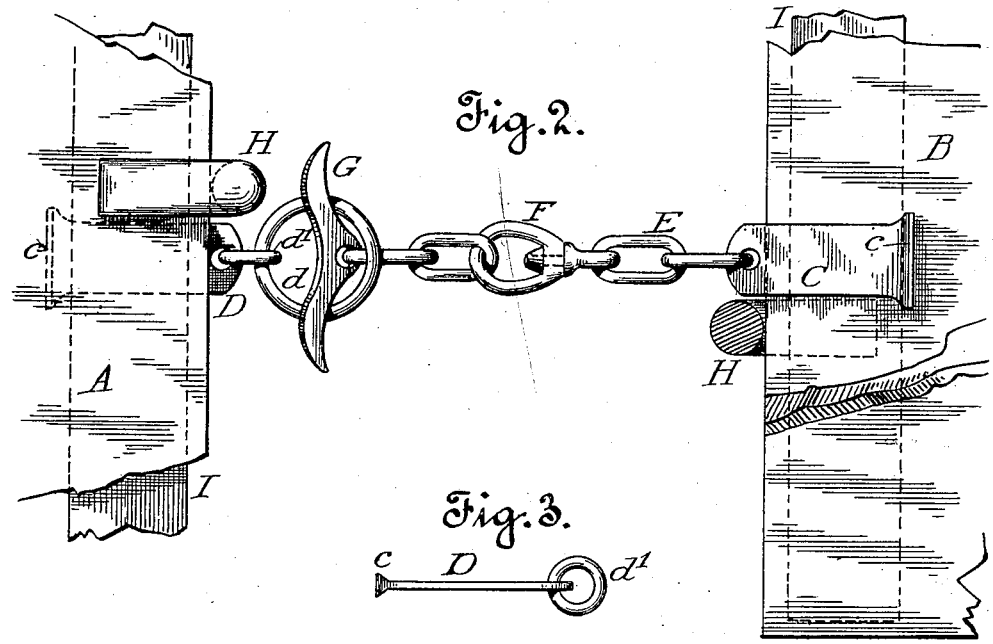
Figure 3:
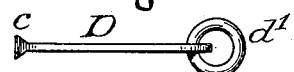

In the accompanying drawings, Figure 1 is a perspective view representing bundled lumber in a flume with my coupling in place. Fig. 2 is a plan view of the coupling. Fig. 3 is a detail edge view of the member of the coupling which is clamped in the bundle.

The bundles A B of lumber are composed of several boards or timbers piled upon one another, so that the edges approximately coincide. The adjacent ends of two bundles are connected by the coupling shown in Fig. 2. Flat pieces of metal C D, such as strap-iron, have lips or flanges $c$ formed at one end, such lips being for the purpose of taking a good hold upon the lumber when clamped between boards. Connected to one of these pieces, as C, is a chain E, which includes a swivel F and terminates in a loosely-connected cross-piece G. Connected to the flat member D are the rings $d\ d'$. The coupling is formed by passing the cross-piece G through the ring $d$, from which it can only be removed by hand when the coupling is slack. I do not limit myself to any particular number, form, shape, or size of links and rings composing the chain coupling nor to the precise construction shown. For instance, the cross-piece G and ring $d$ might be interchanged in position. I prefer, however, the construction illustrated in the drawings. The ring $d'$ gives sufficient flexibility to keep the cross-piece in its proper position without any twisting strain on the member D.

In applying the coupling the boards are first laid evenly in a pile. Then the ends of part of the boards are raised enough to slip the member C or D between for nearly its length. Preferably a member C goes in at one end of the bundle and member D at the other. The clamps H, Fig. 1, are now put on over the ends, and a wedge I is driven in between the two boards next to the coupling members, which tightens and holds the latter in place. The bundle is now put in the flume, with other bundles similarly prepared, and all are coupled together by passing the cross-piece G through the ring $d$. The whole train is then let go down the flume. The stronger and more durable the couplings the greater the number of bundles which can be coupled together, and as greater quantities of lumber are shipped at once more time can be taken in making up trains, and hence trains run under wider headway or with more distance between them. This renders trains less apt to overtake others and pile up, causing delay and expense in getting them in shape again. The swivel prevents any twisting strain upon the couplings and allows the bundles to turn over freely in the flume.

The principal advantages of my coupling lie in its durability and economy as compared with the rope couplings now used. I estimate that a flume can be stocked with my couplings at a cost which is less than the expenditure for rope in a single year, and as the couplings will last for years the first cost is practically the whole cost.

Having thus fully described my invention, what I claim as new, and desire to secure by Letters Patent, is—

1. A coupling for bundled lumber, comprising two metallic members, adapted to be clamped between boards of adjacent bundles, a flexible and separable connection between said members, and a swivel forming part of said connection.

2. A coupling for the described purpose comprising two flat metal pieces which form the ends of the coupling, links or rings connected to each piece, and a loose cross-piece attached to one link or ring and adapted to be detachably connected to an adjacent link or ring the whole coupling being substantially straight when extended.

3. A coupling for the described purpose comprising flat members having end lips or flanges and adapted to be clamped between the bundled boards, chain links connected to each member, a cross-piece on one chain adapted to be detachably connected to the other chain, and a swivel between two adjacent links.

In testimony whereof I have affixed my signature, in presence of two witnesses, this 14th day of February, 1901.

JERRY E. DUBRAY.

Witnesses:
A. L. SPUGLE,
W. C. RING.